# United States Patent [19]

McGinnis et al.

[11] 3,936,880
[45] Feb. 3, 1976

[54] BISTABLE DEFLECTION SEPARATION OF FLEXIBLE DISKS

[75] Inventors: Bernard W. McGinnis, Poughkeepsie; Anthony W. Orlando, Highland; James A. Weidenhammer, Poughkeepsie, all of N.Y.

[73] Assignee: International Business Machines Corporation, Armonk, N.Y.

[22] Filed: July 1, 1974

[21] Appl. No.: 484,830

[52] U.S. Cl. ............... 360/99; 346/137; 360/86; 360/98; 360/105
[51] Int. Cl.² ............... G11B 5/012; G11B 5/60; G11B 17/22; G11B 21/08
[58] Field of Search ............... 360/98, 99, 97, 135; 206/444; 346/137

[56] References Cited
UNITED STATES PATENTS
| | | | |
|---|---|---|---|
| 3,226,701 | 12/1965 | Masson | 360/99 |
| 3,509,553 | 4/1970 | Krijnen | 360/98 |
| 3,618,055 | 11/1971 | Van Acker et al. | 360/98 |

Primary Examiner—Alfred H. Eddleman
Attorney, Agent, or Firm—Robert Lieber

[57] ABSTRACT

Multiple (e.g. 500) ultra-thin flexible storage disks are stacked in a closely spaced configuration between circular end plates and arranged for rotation together with the plates about a common axis. Recording surfaces of the rotating disks are deflected to successively expand (open) and contract (close) a selected interface and thereby provide recording access at the expanded interface. Separation of the selected interfacing surfaces for access is facilitated by maintaining a predetermined air pressure between the contracted disks which conditions the rotation of the disks to bistability in the contracted position. Thus only a small initiating force is required to expand any selected interface with the disks initially contracted. This reduces disk wear. Expansion of a selected interface is accelerated (for shortening access time) by applying vacuum to the disks in synchronism with the initiating force. Advantageously recording surfaces on both sides of the expanded interface rotate in generally flat planar paths, simplifying track location when both surfaces are subject to recording usage.

45 Claims, 45 Drawing Figures

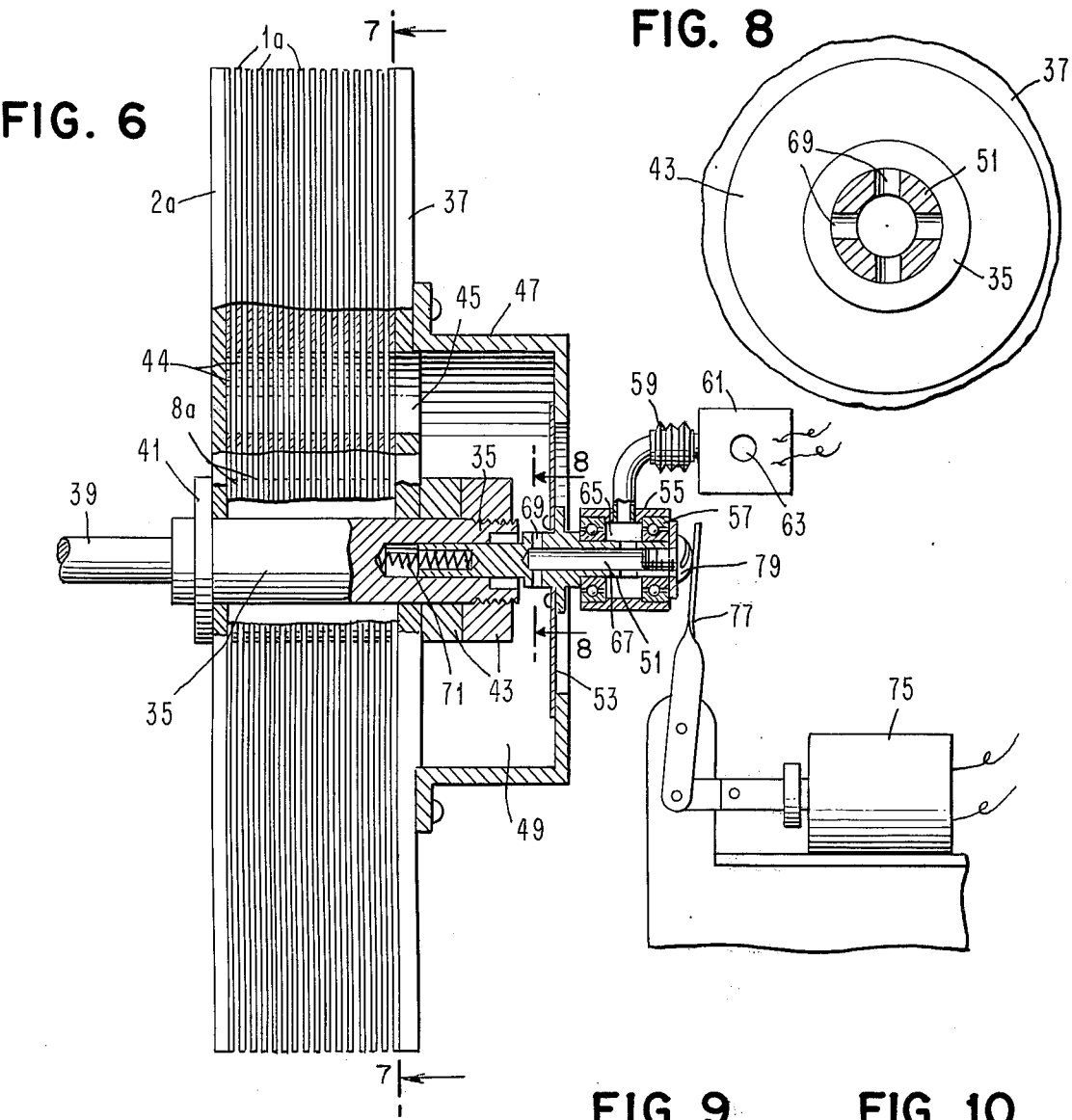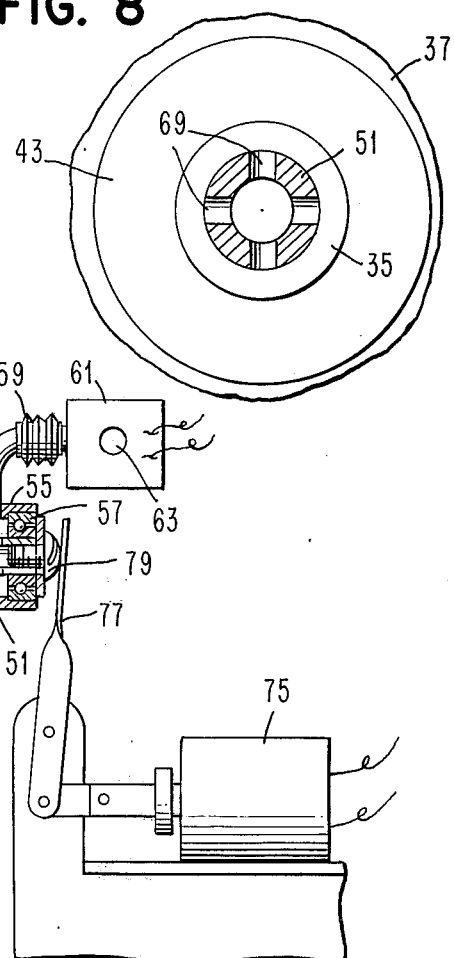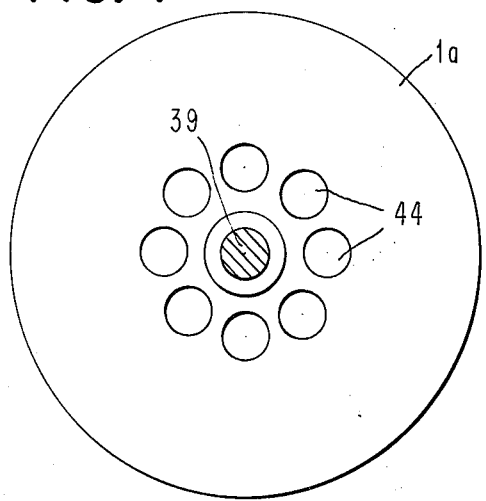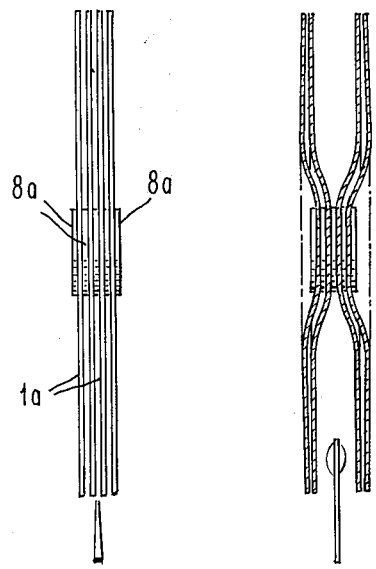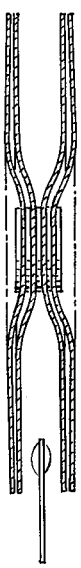

BISTABLE DEFLECTION SEPARATION OF FLEXIBLE DISKS

CROSS REFERENCES TO RELATED PATENT APPLICATIONS

1. U.S. patent application Ser. No. 414,614, by R. J. Penfold et al, filed Nov. 7, 1973, entitled "Multiple Flexible Disk File", assigned to the assignee of the present application, now U.S. Pat. No. 3,867,723 issued Feb. 18, 1975. 2. U.S. Pat. No. 3,810,243, issued May 7, 1974, by B. W. McGinnis et al, entitled "Selectively Tensioned Transducer Assembly for Operation in Compliant Relation to Individual Memory Discs of a Partitionable Aggregate of Rotating Flexible Discs", assigned to the assignee of the present application.

3. U.S. patent application Ser. No. 375,988, by R. A. Barbeau et al, filed July 2, 1973, entitled "Stabilization of Partitionable Memory With Flexible Rotating Discs", assigned to the assignee of the present application, now U.S. Pat. 3,852,820 issued Dec. 3, 1974.

4. U.S. patent application Ser. No. 375,989, by R. A. Barbeau et al, filed July 2, 1973, entitled "Partitionable Disc Memory With Flexible Discs and Conformally Suspended Head", assigned to the assignee of the present application, now U.S. Pat. No. 3,838,462 issued Sept. 24, 1974.

5. U.S. patent application Ser. No. 484,482, filed July 1, 1974 by E. D. Barkhuff et al, entitled "Random Access Disk File With Axial Translation of Disks and End Plate", commonly assigned herewith.

FIELD OF THE INVENTION

The invention relates to random access storage devices in which selected interfaces between recording surfaces, in a stack of multiple flexible memory disks rotating about a common axis, are alternately expanded and contracted while the disks rotate in order to provide access clearance for insertion of a transportable transducing head.

DESCRIPTION OF THE PRIOR ART

The above cross-referenced co-pending patent applications and references cited therein concern stacked configurations of multiple flexible disks which are subject to being deflected apart while rotating in order to form space for insertion of a transducing head relative to a selected disk surface. A problem in the known prior configurations is to avoid or reduce abrasional contact between the disks and the deflection apparatus and thereby lengthen useful recording life of the disks. Another problem is to position the separated recording surfaces on both sides of the opened interface in predetermined orbits which do not vary from interface to interface so that both sides of the disks are useful without special apparatus to relate recording track locations to interface positions.

SUMMARY OF THE INVENTION

An object of the invention is to provide a method of flexing rotating flexible disk multiples for transducing access with reduced abrasive and/or deformational contact between the disks and the selecting apparatus.

Another object is to provide a method of bistably expanding any selected interface in a rotating flexible disk multiple whereby the force required for expansion is lessened due to bistability of the disk rotation and whereby the shape of the expanded interface is uniform over the range of all useful disks so that tracks on both sides of the useful disks are conveniently locatable. A related object is to have flat recording surface paths on both sides of the expanded interface.

Another object is to provide a method and associated apparatus for bistably conditioning the rotation of multiple flexible disks to facilitate triggered expansion of any selected interface and thereby reduce abrasional contact with disk surfaces, in which expansion of the interface is stable in the absence of contact with or deformational stress on the disks.

An advantage of having flat recording surface paths on both sides of the expanded interface is that locating recording tracks on the disks is thereby simplified in comparison to track location when the recording surface paths vary from interface to interface.

Another object is to provide for reduction of disk contact hitherto required to separate packs of co-rotating flexible disks for access.

Yet another object is to provide a reliable and simple method for displacing multiple flexible disks to afford random selective access to recording surfaces within the multiple.

A feature of the invention is the provision of controlled air pressure between multiple flexible disks in a stacked rotating configuration to facilitate stable expansion of any selected interface with negligible abrasive contact and/or deformational stress, and to stabilize the steady state rotation of the disks with said interface expanded.

Another feature is the provision of a predetermined steady state air flow making the rotation of the contracted disks bistable to facilitate interface expansion for recording access — thereby reducing the abrasive and/or distortional contact between the recording surfaces and the apparatus used to cause said expansion — and providing stable maintenance of the expanded configuration without physical contact or bearing support.

A related feature is the discovery that interface openings produced by such bistable expansion can be made to have uniform symmetrical shape at all interfaces whereby opposite sides of disks are useful for recording without special adaptation to relate track location to interface position in the stack.

Another feature is the use of momentary applied vacuum to accelerate the expansion displacement without loss of stability.

The foregoing and other objects and features hereof will be more fully appreciated and understood from the following detailed description of the drawings.

BRIEF DESCRIPTION OF THE DRAWINGS

FIG. 6 is an elevational view partly sectioned and partly schematic of a second embodiment of flexible disk file with spaced interfaces ventilated through off-axis holes in the disks;

FIG. 7 shows a disk employed in FIG. 6;

FIG. 8 is a sectional view of a detail of the air supply coupling in the apparatus of FIG. 6; and FIGS. 9 and 10 are respective views of a contracted and expanded interface in the apparatus of FIG. 6.

DEFINITIONS

Terms such as "expand" and "contract" are used herein to respectively characterize widening and narrowing of a selected space between facing recording surfaces; whereby the affected surfaces are respectively rendered accessible and inaccessible for transducing access. In this context it will be understood that the narrowed interface need not be completely closed (i.e. the affected surfaces need not be touching) and indeed may have variable spacing as nearby interfaces are selectively expanded and contracted.

The term "bistable" is used herein to characterize a condition of the disk aggregate in which the disks, while rotating in one stable configuration — e.g. with all interfaces contracted —, are actuatable to another stable configuration (e.g. with a selected interface expanded and other interfaces contracted) by a transient actuating force. This does not mean to imply that the aggregate is necessarily bistable or reversely actuable in the other configuration.

DETAILED DESCRIPTION

Two embodiments are disclosed. In one of these (FIGS. 1–5) air flows centrally through a radially vented spindle and radially porous spacers into spaces between consecutive disk recording surfaces. In the other embodiment (FIGS. 6–10) air flows through aligned off-axis apertures in the storage disks into spaces between consecutive recording surfaces.

The central air flow arrangement of FIGS. 1–5 resembles the apparatus disclosed in the above-referenced Penfold et al application; except that the steady state air supply is critically adjusted in the present disclosure, for providing bistable expansion operation of the contracted pack, and due to this feature the means presently used for selecting the disks need only act transiently upon the edges of the selected disks and need not be maintained adjacent the disks or otherwise deployed in the expanded interface.

The present off-axis ventilation configuration resembles the above-referenced Krijnen patent U.S. Pat. No. (3,509,553) apparatus, except that present disk apertures and the steady state air supply thereto are respectively designed and adjusted to provide rotational bistability. The present apparatus for selecting the disks, aided by said bistability, is used only to expand a selected interface to a stable configuration suitable for head clearance; whereas the Krijnen selector is integral with the head and operates in a totally different manner.

Figure 1:
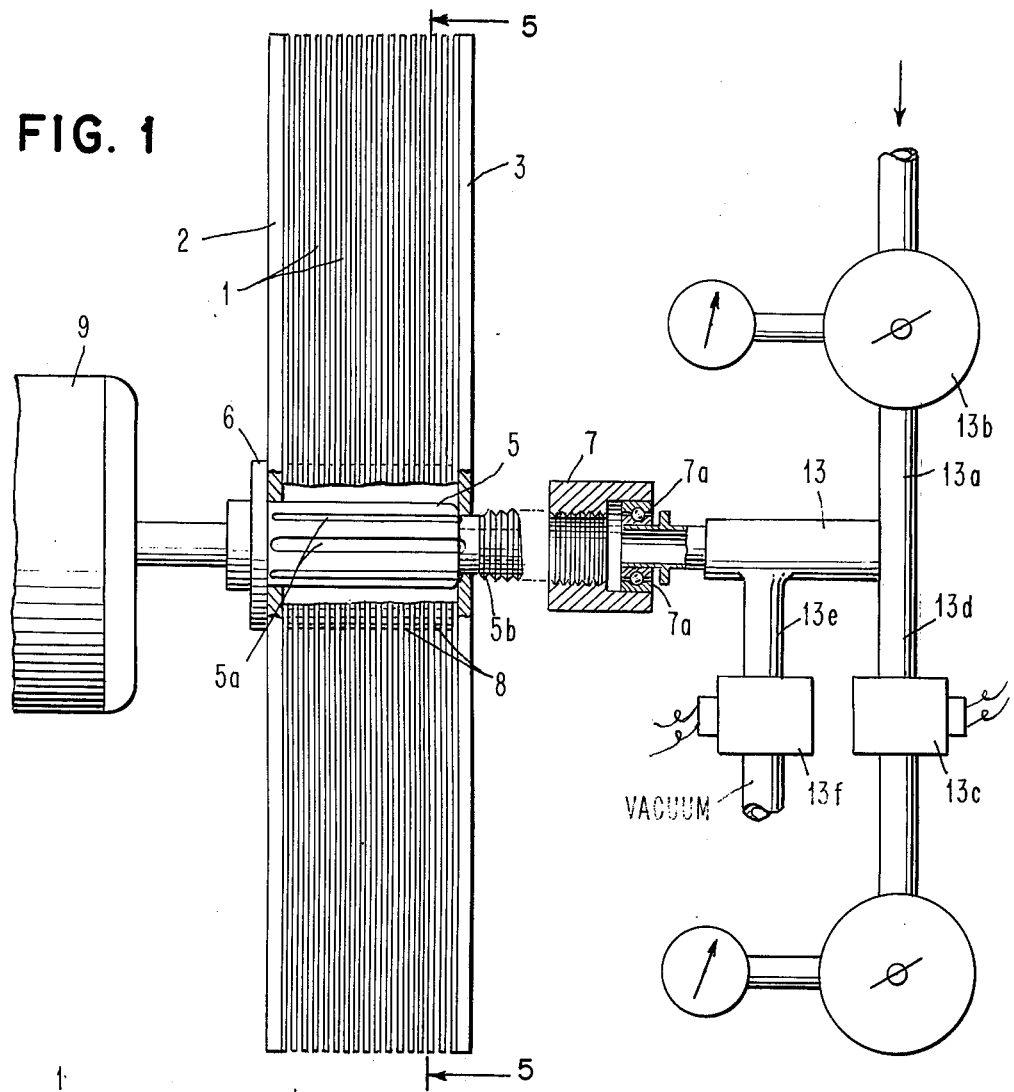
FIG. 1 provides an elevational view partly sectioned and partly schematic of a centrally pressurized rotating flexible disk file with pressure controlled to bistabilize disk rotation and thereby to facilitate interface expansion.
Figure 2:
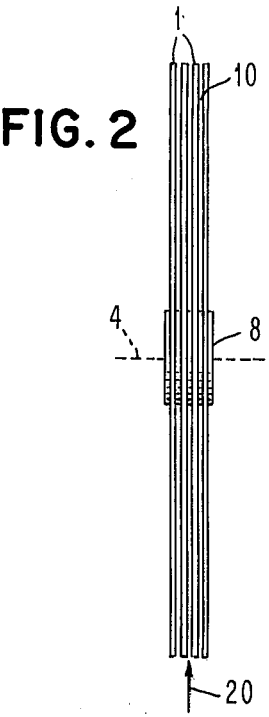
FIG. 2 shows the contracted interface rotational configuration of the centrally pressurized disks.

Referring to FIGS. 1–5, in the centrally ventilated embodiment floppy-type disks 1 are arranged, together with stabilizing end plates 2, 3, for rotation about common axis 4 (FIG. 2). Typically the disks are ultra-thin mylar disks coated with magnetic oxide — ranging in thickness sizes from 1–3 mils and in outer diameter sizes from 8–15 inches — and are rotated at angular velocities ranging from 1100–2400 rpm. It is understood however that these are exemplary values not limiting the range of useful operation.

FIG. 1 is schematic in respect to the number of disks illustrated. The disks are drawn over-sized for clarity. It should be understood however that several hundred recording disks would be provided in the space between end plates indicated in FIG. 1, and 1000 or more storage disks could be aggregated in the indicated configuration for bistable random access selection according to our invention.

The end plates and disks have central holes for mounting upon spindle 5 between clamping end members 6, 7. Disk separations in the contracted configuration (FIG. 2) are determined by thin spacer disks 8 which are mounted between successive memory disks. The assembly of parts 1–8 is rotated by motor 9. In the above-referenced embodiments the spacers typically are approximately 2 mils thick and have outer diameters of approximately 2 inches. In the centrally vented embodiment spindle 5 is hollow and contains longitudinal openings 5a; spacers 8 are radially porous.

Figure 3:
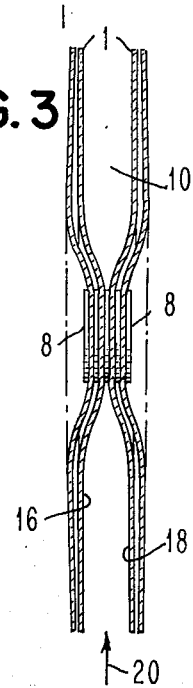
FIG. 3 shows an expanded interface.
Figure 4:
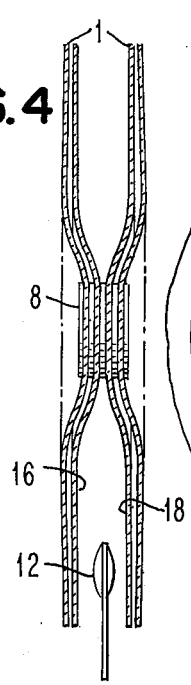
FIG. 4 shows an expanded interface receiving a transducing head.
Figure 5:
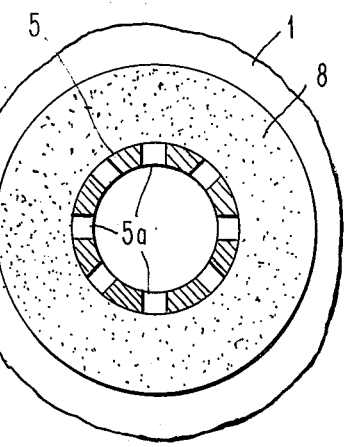
FIG. 5 is a sectional view of the hollow spindle assembly and a spacer disk.

In the contracted configuration (FIG. 2) spaces 10 between successive recording surfaces are insufficient for unobstructed insertion of transducing head 12 (FIG. 4). Upon selection the selectively interface space is widened sufficiently (10a, FIG. 3) to receive the head 12 without interference (FIG. 4) for compliant positioning (not shown) relative to the rotation path of one of the two recording surfaces 16, 18 at said interface.

A problem in regard to displacing recording surfaces of flexible disks is to reduce or minimize abrasive or distortional contact between the displacing apparatus and the selected recording surfaces. We have found that with a particular adjustment of steady state air pressure in the interface spaces between the disks the contracted disks become bistable, as defined above, whereby a selected interface can be expanded by a transient actuating force with negligible or no abrasive contact between the actuating apparatus and the disks. Our invention stems from this discovery.

Rotating hollow member 7 (FIG. 1) is coupled via sealed bearings 7a to a stationary duct-work 13. A steady state supply of air received at intake passage 13a for conveyance to the hollow interior of spindle 5 is manually adjusted at valve 13b to a constant critical pressure level in a range associated with conditioning the contracted pack for bistable rotation as defined above. In this condition the unclamped recording portions of all disks 1 are stable while rotating initially in the contracted configuration (FIG. 2) and are transiently actuable to a stable expanded position (FIG. 3) in which a selected interface is expanded. The actuating displacement force 20 (FIGS. 2, 3) at edges of the affected interfacing disks is sufficient to trigger expansional displacement of the disks to the stable expanded position (FIG. 3).

The steady state pressure adjustment for rotational bistability is determined empirically and is just above the range providing little or no air flow in the interfaces of the contracted pack. In the latter condition the interfaces are subject to uncontrollable spontaneous expansion without external actuation, due to development of vacuum in the interfaces by centrifugal pumping action. In the bistable range the pressure in the unexpanded interfaces is kept below atmosphere to a lesser degree but the interface spacing remains uniform in stable pressure equilibrium until disturbed by positive external actuation. Any initial widening of a selected interface, as by a probe, air, jet, etc., admits an increased supply of air to that interface. This upsets the pressure equilibrium and forces the adjacent disks apart until a new stable equilibrium is reached between the pressure in the expanded space and the pressures in the other interfaces. Surprisingly this new equilibrium is reached quite rapidly with oscillational overshoot and undershoot if any being quickly damped. Also surprising, the width of the expanded interface is ample for transducing access.

Experimental observations indicate that the bistable adjustment range is variable in relation to such determining factors as disk geometry, number of disks in the pack, rotational speed and ventilation configuration for distributing air to the disks. For the centrally ventilated configuration of FIGS. 1–5, with geometry and rotation in ranges as specified above, the steady state supply pressure associated with rotational bistability is found typically to lie in the range 2–5 inches of water.

The displacement action of the selected disks in response to selecting force 20, under bistable air flow conditions may be likened conveniently to the switching action of electronic flip-flop circuits. Naturally it is understood that the head 12 and the selecting apparatus exerting force 20 are transportable relative to the disk assembly, and operable to actuate the selected interface, by means not relevant to the present invention and described elsewhere in the above cross-references. Furthermore, force 20 may be exerted by a contacting probe or a directed air jet.

Interestingly and advantageously the displaced recording surfaces at the selected interface (16, 18 FIG. 3) stabilize uniformly in flat rotational paths over a broad range of interfaces, simplifying track location. In earlier arrangements of the type disclosed in the above-referenced Ser. No. 375,989 by Barbeau et al the facing disks at the selected interface rotate in unsymmetrical paths, one flat and the other curved, and the curved paths vary from interface to interface depending upon the number of disks contained in the pack segment displaced into the curved path. Thus, track positions in the curved path and signal packing in the curved path would vary; such variation complicating reproduction access.

A word of explanation is in order, concerning the reference in the preceding paragraph to a range of interfaces. As noted in the previously cross-referenced U.S. Pat. No. 3,810,243 to McGinnis et al the compliant action between the head and selected surface can be held to uniformly tight tolerances only when a predetermined minimum number of "cushioning" disks (e.g. 25) are backing the selected surface. In said patent the disks shown are "unspaced" when not positively deflected apart, but the same principles apply to the present spaced bistable configuration.

Upon entering the expanded space 10a head 12 is guided laterally into "dimpling" compliant relation to the rotation path of one of the interfacing surfaces 16, 18, essentially in the manner disclosed in the above-referenced commonly assigned U.S. Pat. No. 3,810,243 by McGinnis et al; this intimately couples the head with the selected surfaces for high density. At completion of such operation the head may be withdrawn from the selected interface and the disks then restored to the contracted rotation position in preparation for the next selection operation. In the illustration contraction is caused by momentarily energizing solenoid valve 13c. This admits air, at a non-critically pre-adjusted elevated pressure, to contraction supply duct 13d. This restores the disks to contracted position and when the air supply returns to steady state level the disks are once again bistable. The action is non-critical and other methods of restoring the disks to contracted bistable operation will readily occur to those skilled in the art.

The time required to expand the selected interface can be reduced, thereby reducing storage access time, by applying vacuum to the disks during their transitional displacement to the expanded position. For this purpose vacuum is applied to duct passage 13e by operation of solenoid valve 13f in synchronism with said transitional displacement.

Hollow spindle 5 contains reduced diameter hollow end portion 5b supporting end plate 3 (said plate having a corresponding reduced diameter central opening for mounting on the spindle) which is threaded externally to couple threadably with an internal thread on hollow member 7; whereby member 7 seats retainingly adjacent plate 3.

In operation the adjusted steady state air supply to passage 13a is distributed to the spaces between disks 1 via passage 13, hollow interiors of member 7 and spindle 5, apertures 5a in spindle 5 and pores in spacers 8. This steady state supply of air is pumped radially out of the spaces between the contracted disks by centrifugal action. The resulting continuous negative pressure between the disks conditions the rotation of the unclamped portions of disks 1 to bistability exclusively in the contracted position.

Meanwhile the mechanism supplying selection force 20 is positioned adjacent the desired contracted interface to which access is required and operated to exert force 20 upon the facing disks. This initiates expansional deflection of the facing disks to the stable expanded position (FIG. 3); said expansional displacement being accelerated by synchronous application of vacuum to passage 13e through operation of solenoid 13f. Meanwhile the head which has been concurrently positioned opposite the selected interface is inserted centrally into the stabilized expansion opening and guided smoothly into hydrodynamically lubricated relation to one of the facing recording surfaces. When the head operation is completed, and assuming the next operation to be scheduled relative to a different interface, the head is retracted. The disks are then contracted by operation of solenoid valve 13c, and the operations for selecting the next interface are started.

In the second embodiment of FIGS. 5–10 flexible storage disks 1a, separated by spacer disks 8a, are mounted upon spindle 35 and retained axially by end plates 2a and 37. Spacers 8a and spindle 35 need not conduct air. Spindle 35 is connected to shaft 39 which is rotated continuously by a not-shown motor. The disks, end plates and spindle thereby rotate as a unit. The end plates are axially clamped by shoulder extensions 41 of shaft 39 and 43 of the spindle.

Disks 1a have aligned off-axis ventilation openings 44 which are further aligned with holes 45 in end plate 37. Housing 47 attached to end plate 37 forms part of a ventilation sub-chamber 49 which communicates via end plate holes 45 with disk ventilation holes 44. Spindle extension 51 is rotatably linked to spindle 35 and adapted for axial displacement relative to the spindle. Throttle plate 53 attached to extension 51 completes the closure of ventilation sub-chamber 49 relative to atmosphere when extension 51 is in its most extended position relative to the spindle. Non-rotating air supply coupling 55, supported on the rotating extension 51 via bearings 57 receives filtered air through elements 59, 61 and 63. Adjustable valve 61 provides an adjusted opening 63 between atmosphere and an internal chamber connecting to flexible tubing 59. This supplies steady state air pressure, through passage 65 in non-rotating coupling 55 and passages 67 and 69 in rotating coupling 51, to sub-chamber 49. In turn this transfers steady state air pressure, via end plate openings 45 and aligned disk openings 44, to the interfaces.

Normally, spring 71 biases extension 51 to the most extended position in which sub-chamber 49 is sealed off from atmospheric air by abutment of plate 53 against housing 47. In this condition only the above-mentioned steady state air supply reaches the sub-chamber 49 and the disk openings 44. Said supply is adjusted to cause rotational bistability in the unclamped portions of the disks 1a when the disks are initially in contracted mode (FIG. 9), as explained above for the centrally pressured embodiment. Therefore the disks can be stably triggered apart at any selected interface for transducing access in this mode. Expansional deflections can be accelerated by actuating valve 61 to close opening 63 in synchronism with the initial deflection movement, thereby effectually applying vacuum to space 49.

To contract the expanded disks, after completion of transducing operation, as explained above for the centrally pressured embodiment, solenoid 75 is excited momentarily displacing armature 77 against bearing surface 79 of extension 55 moving said extension toward the spindle and thereby displacing plate 53 away from sub-chamber housing 47. This opens the sub-chamber to atmosphere momentarily, and thereby momentarily increases air flow through the disks to a level cancelling their rotational stability and restoring them to contracted configuration in readiness for bistable operation.

In the illustrated embodiment the disks have eight holes 44, each 1 ½ inch diameter, centered at radial distances of 2 ¼ inches from the axis of rotation and uniformly located in a circle around said axis. Again, these dimensions are given as exemplary and not limiting.

The use of atmospheric air as the source of steady state air pressure need not be uniquely restricted to this second embodiment. In the centrally pressured embodiment of FIG. 1 a similar atmospheric coupling could be used if the shape of spacer disks is selected to have suitable lower resistance to air flow than the mesh spacers disclosed by Penfold et al; e.g. by using spacers having open radial channels for air conduction.

While the invention has been particularly shown and described with reference to preferred embodiments thereof, it will be understood by those skilled in the art that various changes in form and detail may be made therein without departing from the spirit and scope of the invention.

What is claimed is:

1. In a data storage device including multiple centrally restrained flexible storage disks arranged in a stack for continuous rotation about a common axis, with fluid-permeable open spaces between recording surfaces of successive disks and with the disks bendable between their centers and peripheries while rotating to effect stable expansion and contraction of any selected space between recording surfaces of successive said disks suitable for providing random selective external transducing access to surfaces adjacent the selected space, the improvement comprising:

pressure control apparatus for establishing a first fluid pressure condition, in a predetermined pressure range, in said spaces between said disks; said condition having the effect of allowing the rotation of said disks to be stabilized uniquely in discrete first and second rotational configurations characterized in that the disks are all evenly spaced and inaccessible in said first configuration and unevenly separated at one selected space in said second configuration rendering said selected space accessible to receive an external transducer; said condition characterized in that it does not permit the rotational positions of the disks to stabilize in configurations of separation intermediate said first and second configurations and thereby renders the disks subject to expansion manipulations to said second configuration by small transiently applied forces.

2. A device as in claim 1 including means for effecting said expansion manipulation to said second configuration by momentarily touching edges of said disks at a said selected space while said disks are in said first evenly spaced configuration and said spaces between the disks have said first pressure condition.

3. A device as in claim 1 including means for effecting said expansion by momentarily varying said pressure condition at said selected space while the disks are in the evenly spaced first configuration.

4. A device as in claim 1 including means for effecting said expansion by momentarily displacing said disks.

5. A device as in claim 4 including means for accelerating the displacement motion of said disks during said expansion by decreasing said pressure below said first condition momentarily during said momentary expansion displacement of said disks.

6. A device as in claim 1 wherein said fluid is air.

7. A device as in claim 1 wherein said disks have aligned holes forming a continuous internal space connecting uniformly with said spaces between said disks and said apparatus comprises a source of fluid at a constant predetermined critical pressure for establishing said first condition and conduit means for conducting said fluid to said internal space for distribution to said open spaces between the disks for use in facilitating bending manipulations of said disks for said expansion displacements.

8. A device as in claim 7 wherein there is one said hole per disk encompassing the center of rotation of the respective disk.

9. A device as in claim 7 wherein there are plural said holes per disk and said holes are off-axis perforations having predetermined spacing and dimensions.

10. A device as in claim 7 including inflexible end plates at opposite ends of said stack rotating coaxially with said disks; one of said end plates having an opening communicating with said conduit means for conducting said fluid to said internal space for said distribution; said stack including small-diameter spacer members between successive said storage disks for establishing the contraction spacing of said storage surfaces of said disks in said first stable configuration; and including means movable externally relative to said disks for selectively effecting said expansion displacement to said second configuration by applying transient displacing force to said disks at a said selected space.

11. A device as in claim 10 for accelerating said expansion displacement by momentarily decreasing the supply of fluid at said end plate opening during the application of said displacing force.

12. A device as in claim 10 wherein: there is one said hole per storage disk encompassing the center of rotation of the respective disk; said spacer members have central holes aligned with said storage disk holes and radial passages; said spacer members and a storage disks are mounted via surfaces adjacent respective said holes on a hollow perforated rotating spindle containing said internal space and adapted to provide axial fluid flow between said one end plate opening and said radial passages of said spacers and thereby permitting radial fluid flow relative to said open spaces between said disks for centrifugal circulation by said disks.

13. A device as in claim 10 wherein said holes are off-axis perforations of predetermined dimensions in said storage disks, outlying the peripheries of said spacers and serving to conduct said fluid from said end plate opening directly to said open spaces between said disks.

14. A device as in claim 10 wherein said end plate opening is connected externally to a plurality of fluid supply conduits one of which is adapted to provide a continuous steady state supply of fluid at a pressure suitable for establishing said predetermined first fluid pressure condition.

15. A device as in claim 14 wherein another of said conduits is connectible transiently to a source of reduced pressure for accelerating said expansion during application of said displacing force.

16. A device according to claim 14 wherein another of said conduits is connectible transiently to a source of fluid at elevated pressure relative to said steady state supply for rendering said disks unstable in said second configuration and urging said disks from said second configuration to said first configuration.

17. A device as in claim 10 wherein the space selectively widened in said second configuration has a predetermined shape determined by the shapes of the rotational paths traced by recording surfaces of the adjacent storage disks, and wherein said shape is substantially uniform over a range of multiple said spaces subject to selection.

18. A device as in claim 17 wherein said paths traced by said recording surfaces adjacent a said selectively widened space are substantially flat parallel circular bands, when said adjacent recording surfaces are not displaced by transducing apparatus, and have sufficient separation to allow for unobstructed maneuvering of external transducing apparatus into the respective space.

19. A device as in claim 18 in which said fluid is air; said pressure control apparatus including a source of pressured air coupled to said end plate opening for supplying a continuous steady state flow of air which is circulatable through said open spaces by centrifugal action in manner suitable for establishing said first predetermined pressure condition and thereby facilitating widening displacement of said stack.

20. A device as in claim 19 including means for effectively coupling vacuum transiently to said end plate opening, by momentarily blocking off said steady state flow, in coordination with each said momentary application of displacing force, thereby accelerating the associated widening displacement of said disks to said second configuration.

21. A device as in claim 19 including means for momentarily coupling additional air at elevated pressure to said end plate duct to to restore said disks from said second configuration to said first configuration.

22. A device as in claim 19 wherein said means for effecting said displacement includes means for momentarily displacing peripheral edges of the storage disks at said selected space.

23. A device as in claim 19 wherein said means for effecting displacement includes means for momentarily varying the fluid flow condition in the selected space relative to all other spaces between said disks.

24. In a data storage device including an externally transported transducer and multiple coaxially stacked flexible storage disks having fixed center spacings and arranged for continuous stable rotation about a common axis, said disks separated by smaller diameter porous spacer disks narrower than said transducer and defining open spaces between storage surfaces, said storage and spacer disks having central openings forming a continuous internal space permeable to air flow through said spacers and in said open spaces between said storage disks, improved means for effecting random selective bending deflections of recording surfaces of said storage disks at any selected interface space between said surfaces in order to render said recording surfaces at said interface space accessible to said transducer comprising:

means for conducting a steady state supply of air at predetermined pressure to said internal space for conditioning said storage disks to have bistable rotational stability such that a transitory force can be used to expand a said selected interface space quickly and with sufficiently predeterminate and stable form to accommodate an external transducer without obstruction and without specialized transducer positioning apparatus for varying transducer positioning at different interface positions.

25. A device according to claim 24 further including:
means aided by said steady state air supply for effecting stable expansional deflection of said recording surfaces at a selected interface.

26. A device according to claim 24 wherein said steady state air supply is maintained at a level conducive to stabilizing and flattening paths of rotation of said expansionally deflected recording surfaces.

27. A device according to claim 24 including means for momentarily supplying restorational air pressure to contractably deflect said expansionally deflected surfaces to produce contraction of the associated interface.

28. A device according to claim 26 including means for applying vacuum to said central openings synchronous with said expansional deflection for accelerating expansion of the associated interface.

29. In a data storage device:
coaxial stabilization plates having constant spacing along a common axis;
multiple flexible storage disks and spacers coaxially stacked between said plates and arranged for continuous rotation about said axis; centers of said plates, disks and spacers having fixed axial positions; said spacers providing predetermined open spaces between successive said disks for centrifugal air circulation useful to stabilize said rotation; said spaces being insufficient to permit unobstructed transducing access to recording surfaces of said disks; said plates permitting limited axial bending displacements of said disks, relative to any one said air circulation space, sufficient to widen said space for transducing access;

means for supplying a predetermined steady state flow of air at a pressure below a predetermined critical level to said air circulation spaces between all said disks;

means aided by said steady state flow for utilizing transitory force effects to cause stable bending displacements of the disks at successively selected said air circulation spaces, whereby each said selected space is stably and uniformly expanded for stable and uniform transducing access.

30. A device according to claim 29 wherein disk recording surfaces separated by said bending displacement tend to rotate in substantially flat planar paths generally perpendicular to said axis.

31. A device according to claim 30 wherein at least one of said plates is arranged to rotate with said disks.

32. A device according to claim 30 wherein said disks have axially aligned holes, forming an internal air conduction space connecting with said spaces between said disks, and said air supplying means is arranged to supply air to said internal space from a source external to the space occupied by said disks and plates.

33. A device according to claim 32 wherein said disk holes are auto-ventilating off-axis perforations and said air supplying means comprises at least one opening in at least one of said end plates for controllably admitting external air into the internal spaces formed by said perforations.

34. A device according to claim 33 wherein said air supplying means comprises means for momentarily varying the flow of air through said at least one plate opening to accelerate said bending displacement.

35. A device according to claim 32 wherein said aligned disk holes centrally encompass said axis, said spacers are porous and said air supplying means comprises a source of air coupled to said holes via a duct in an end said disk and wherein said air flow varying means comprises means for momentarily applying vacuum to said central holes.

36. A device according to claim 34 said varying means including means for applying vacuum to said axial air conduction space while initiating said bending displacement in order to accelerate the displacement and thereby reduce access time to said disk recording surfaces.

37. A device according to claim 35 said vacuum applying means being synchronized in operation with said bending displacement in order to accelerate the displacement and reduce access time to said disk recording surfaces.

38. In a data storage device:

multiple flexible storage disks and spacer disks coaxially stacked between confining and stabilizing end plates; said disks and plates arranged for continuous co-rotation about a common axis with recording surfaces of said disks subject to bistable rotation in contracted positions permitting low force triggered expansion of any interface of said stack; centers of said disks and plates having fixed axial positions; said spacer disks providing predetermined spaces between successive said storage disks which permit a predetermined steady state supply of air to circulate in said spaces by centrifugal action and stabilize and flatten the rotational paths of said recording surfaces in both said expanded and contracted positions;

spaces between successive disks in said contracted positons being insufficient to permit unobstructed insertion of a transducing head therein; said plates being positioned to limit expansional deflection of said recording surfaces of said storage disks to allow expansion of at least one interface between successive disks sufficient for insertion of said head and thereby permit access to recording surfaces at said interface; said storage disks and plates having internal openings permitting distribution of said steady state supply of air via one of said plates to said spaces between said storage disks for bistabilizing the rotation of said recording surfaces; and means aided by said steady state circulation for effecting expansional deflection of said recording surfaces at a selected interface.

39. A device as in claim 38 wherein said recording disks have off-center holes for conducting a steady state supply of air to said spaces between said recording surfaces; including means for admitting an additional supply of air to said holes for effecting contractional displacement of said disks.

40. A device as in claim 38 wherein said spacer disks are porous to radial air flow and said recording disks, spacer disks and end plate have aligned central openings permitting passage of air from said end plate to said spacer disks and through said spacer disks radially by centrifugal action into and through the spaces between said storage disk recording surfaces; said steady state air supply being coupled from a source of pressured air through said end plate opening.

41. A device as in claim 38 wherein said disks and end plate are rotated at high speeds in the rnage of 1100–2400 rpm; and wherein said recording disks have outer diameters in the rane 8 – 15 inches and axial thickness measurements in the range 1–3 mils; and wherein said spacer disks have outer diameters less than 4 inches and axial thicknesses in the range 2 – 7 mils.

42. A device as in claim 41 wherein said recording disks have off-center holes for conducting steady state pressured air flow to said spaces between said recording surfaces.

43. A device as in claim 41 wherein said spacer disks are porous to radial air flow and said recording disks, spacer disks and end plate have aligned central openings permitting passage of air from said end plate to said spacer disks and through said spacer disks radially by centrifugal action into and through the spaces between said storage disk recording surfaces; said steady state air being supplied through said end plate opening.

44. A device in accordance with claim 39 wherein said means for admitting additional air comprises a movable plate.

45. In a data storage device, in which multiple interfacing flexible storage disks arranged in a packed configuration for continuous co-rotation in an environmental fluid are maintained in an aerodynamically balanced pressure state and caused to be intermittently deflected at selected interface positions for transducing access, a deflection control method comprising:

establishing a predetermined critical state of disturable pressure balance in said fluid while the storage disks are rotating in an undeflected configuration; and deflecting said disks into a stable separated configuration by creating a momentary pressure imbalance in said fluid, relative to a selected interface, which operates in conjunction with the existence of said critical pressure state to exert a stable deflecting influence on the rotational orbits of the disks.

* * * * *